United States Patent
Chang et al.

(10) Patent No.: US 7,765,172 B2
(45) Date of Patent: *Jul. 27, 2010

(54) ARTIFICIAL INTELLIGENCE FOR WIRELESS NETWORK ANALYSIS

(75) Inventors: Yuan-Lung Chang, Singapore (SG); Yuan-Huei Chang, Taipei (TW)

(73) Assignee: Robert Hungchin Lo, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/361,092

(22) Filed: Jan. 28, 2009

(65) Prior Publication Data

US 2009/0138416 A1    May 28, 2009

Related U.S. Application Data

(63) Continuation of application No. 11/420,879, filed on May 30, 2006, now Pat. No. 7,512,570.

(51) Int. Cl.
*G06F 17/00* (2006.01)
*G06F 17/20* (2006.01)

(52) U.S. Cl. ........................................................ 706/11
(58) Field of Classification Search .................... 706/11
See application file for complete search history.

(56) References Cited

U.S. PATENT DOCUMENTS

| | | | |
|---|---|---|---|
| 6,791,944 B1 * | 9/2004 | Demetrescu et al. | 370/235 |
| 7,002,943 B2 * | 2/2006 | Bhagwat et al. | 370/338 |
| 7,089,266 B2 * | 8/2006 | Stolte et al. | 1/1 |
| 7,154,874 B2 * | 12/2006 | Bhagwat et al. | 370/338 |
| 7,248,858 B2 * | 7/2007 | Barber et al. | 455/414.1 |
| 7,286,474 B2 * | 10/2007 | Garg et al. | 370/230 |
| 7,295,119 B2 * | 11/2007 | Rappaport et al. | 340/572.4 |
| 7,295,960 B2 * | 11/2007 | Rappaport et al. | 703/13 |
| 7,339,897 B2 * | 3/2008 | Larsson et al. | 370/252 |
| 7,382,756 B2 * | 6/2008 | Barber et al. | 370/338 |
| 7,512,570 B2 * | 3/2009 | Chang et al. | 706/11 |
| 7,567,822 B2 * | 7/2009 | Hart et al. | 455/562.1 |

OTHER PUBLICATIONS

A Comprehensive Performance Study of OPNET Modeler for ZigBee Wireless Sensor Networks, Hammoodi, I.S.; Stewart, B.G.; Kocian, A.; McMeekin, S.G.; Next Generation Mobile Applications, Services and Technologies, 2009. NGMAST '09. Third Intl Conference on Digital Object Identifier: 10.1109/NGMAST.2009.12 Publication Year: 2009 , pp. 357 -362.*

Performance Evaluation in All-Wireless Wi-Fi Networks, Carpinteiro, G.; Correia, L.M.; Vehicular Technology Conference, 2008. VTC 2008-Fall. IEEE 68th Digital Object Identifier: 10.1109/VETECF.2008.383 Publication Year: 2008 , pp. 1-5.*

(Continued)

*Primary Examiner*—Michael Holmes
(74) *Attorney, Agent, or Firm*—Ming Chow; Sinorica, LLC

(57) ABSTRACT

This invention relates to using artificial intelligence for analyzing real-life collected data from an operation system, modeling the collected data to identify characteristics of events, analyzing the models to conclude an optimal solution for maximizing the performance of the operation system.

20 Claims, 2 Drawing Sheets

OTHER PUBLICATIONS

Performance enhancement of EDCA access mechanism of IEEE 802.11e wireless LAN, Rawat, D.B.; Popescu, D.C.; Min Song; Radio and Wireless Symposium, 2008 IEEE Digital Object Identifier: 10.1109/RWS.2008.4463540 Publication Year: 2008 , pp. 507-510.*

An adaptive polling algorithm with differentiation strategy in IEEE 802.16 multi-hop networks with IEEE 802.11e WLANs Myounghwan Lee; Copeland, J.A.; Performance Computing and Communications Conference (IPCCC), 2009 IEEE 28th International Digital Object Identifier: 10.1109/PCCC.2009.5403850 Publication Year: 2009 , pp. 354-359.*

* cited by examiner

ARTIFICIAL INTELLIGENCE FOR WIRELESS NETWORK ANALYSIS

RELATED APPLICATION

The present invention is a continuation application of and claims priority to the U.S. patent application Ser. No. 11/420,879, filed on May 30, 2006 now U.S. Pat. No. 7,512,570, and is herein incorporated in its entirety by reference for all purposes.

FIELD OF INVENTION

This invention relates to analyzing real-life collected data by using various modeling algorithms to generate various aspects of models. These models represent different characteristics of behavior from where the real-life data were collected. Further, these models are analyzed by various analysis tools to conclude an optimum expectation. The optimum expectation can be dynamically refined by adjusting constraints so that an optimum solution can be obtained in order to meet the real-life behavior needs.

BACKGROUND OF THE INVENTION

Information processing has been an important technology in our daily life. It determines what we do, how we do, when we do, where we do, and who to do for anything in our life. Due to technologies development, the information processing speed has been faster and faster. The outcome of the processed information are various data. The human intelligence has been proved for efficiently handling and analyzing many processed data in order to determine an optimum solution. However, in nowadays, the amount of data that are generated by the modern technologies and systems has been far more beyond the human being's capability to analyze and determine an optimum solution. Therefore, we have to rely on the technology of artificial intelligence for consolidating essential intelligence, and the technology of high processing speed of a system to conclude an optimum solution in order to achieve a desired performance requirement.

SUMMARY OF THE INVENTION

This invention is an artificial intelligence analyzer and generator for collecting, partitioning, modeling, and analyzing the massive data that are generated from time to time in our daily life. All of the data are related in a sense that one may affect the other. Further, each representing data may also bear different "weight" in affecting the others. Therefore, complex relationships are established between these data. For example, when fifty grocery shoppers checking out at the same time, a "ten casher checkout lines" store and a "five casher checkout lines" store make the customer waiting time for checkout are different. Therefore, when the manager of the "five casher checkout line" store needs to make a decision of adding cashers he needs to consider many factors including the number of available cashers at a particular time, labor cost of each casher, cost of spaces for adding checkout lines, and many other factors. Any factor may impact the solution of the manager to make an optimum solution. This example is a simple case which may be easily analyzed and concluded by a human being. However, when the affecting factors become huge, we must rely on consolidated artificial intelligence to analyze the collected data and rely on high speed processing system to conclude an optimum solution in a reasonable and acceptable time so that we can accommodate the changes.

This invention collects data from a real life by knowing various affecting factors, and partitions the data and group the data in a way it can be efficiently retrieved. This invention sets up different models based on the collect data so that it represents different characteristics of the real life. It analyzes the models (characteristics) to conclude an optimal model that represents the operation behavior of a real-life system, and associated constraints. By obtaining an optimal model, an optimal solution can be concluded based on known and desired operation requirements.

A more complete understanding of the present invention, as well as further features and advantages of the present invention, will be obtained by reference to the following drawings and detail descriptions.

DETAIL DESCRIPTIONS OF THE INVENTION

Terminology and Lexicography

Figure 1:
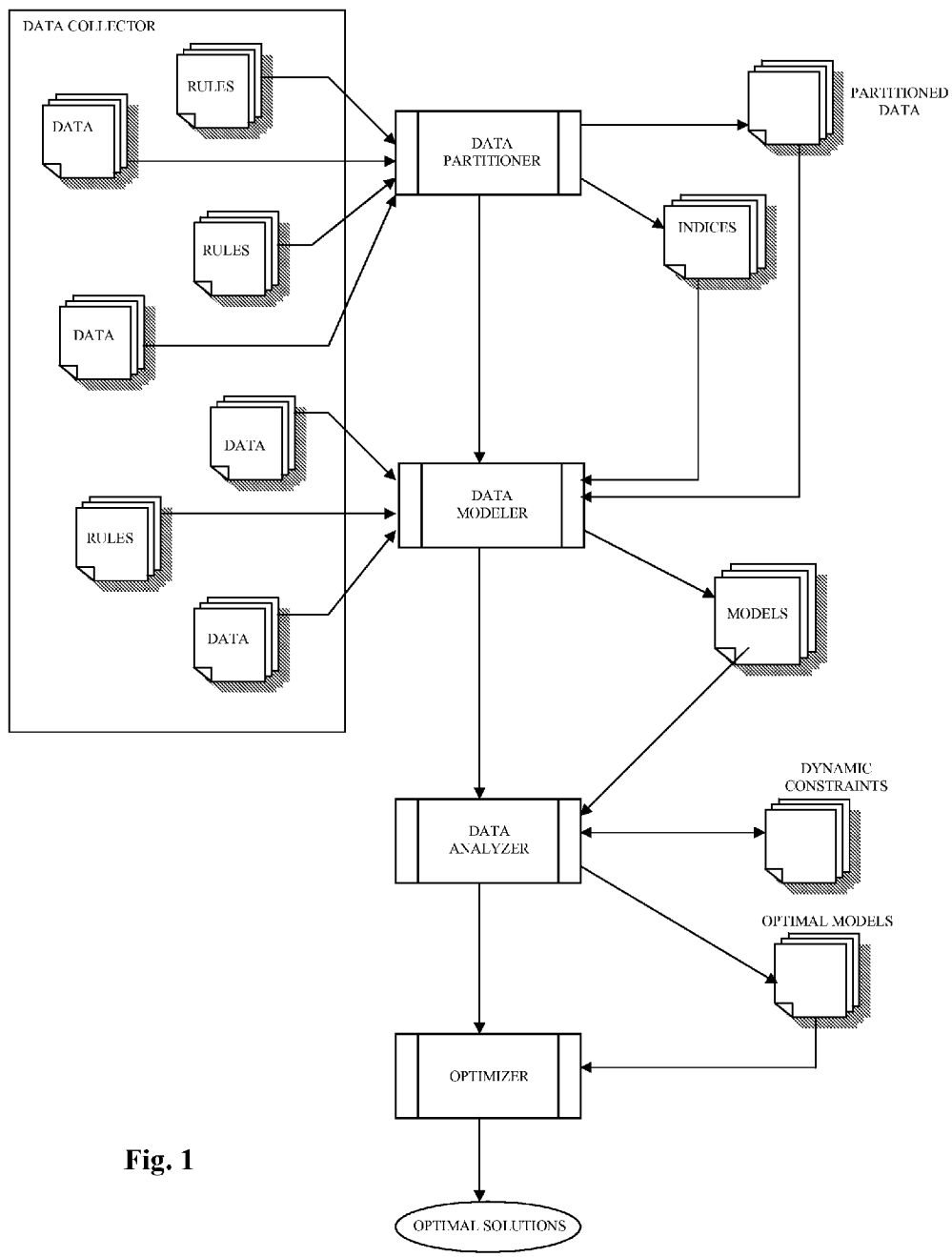
FIG. 1 is a system overview of this invention.
Figure 2:
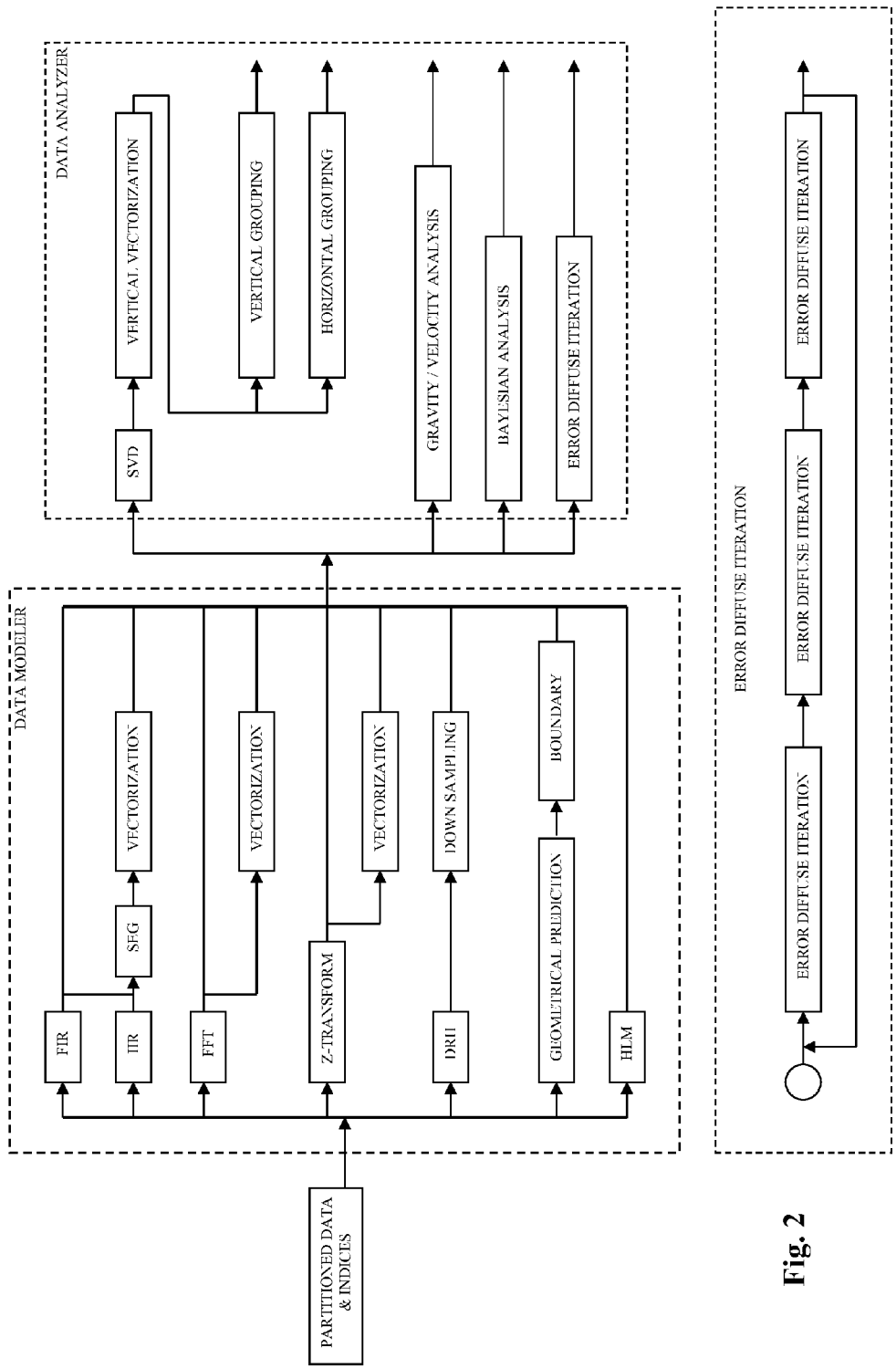
FIG. 2 is a detail process flow of the Data Modeler and Data Analyzer

Plurality types of data: Data of different characteristic meaning. For example, but not limited to, number of calls within a period of time, radio frequency usage, data accessing rules, network topologies, etc.

Modeling: A process of generating an abstract model that uses mathematical language to describe the behavior of a system.

Replicate-Tree Indexing: A method of indexing Replicate-tree structures.

Hash Code Indexing: In computer science, a hash table, or a hash map, is a data structure that associates keys with values. The primary operation it supports efficiently is a lookup: given a key (e.g. a person's name), find the corresponding value (e.g. that person's telephone number). It works by transforming the key using a hash function into a hash, a number that the hash table uses to locate the desired value.

Reverse Indexing: A database index that uses the reversal of the key values rather than the values themselves.

Suffix Indexing: An indexing method for a suffix tree of a string S of n characters containing all n suffixes of S. It is a substring index.

Average Value: Arithmetic mean.

Normal Distribution: The normal distribution, also called Gaussian distribution, is a probability distribution. It is a family of distributions of the same general form, differing in their location and scale parameters: the mean ("average") and standard deviation ("variability"), respectively. The standard normal distribution is the normal distribution with a mean of zero and a standard deviation of one. It is often called the bell curve because the graph of its probability density resembles a bell.

Common Occurrence: A statistic and normalization algorithm by dynamically adjusting normalization criteria according to distribution of distinct values of normalized data.

Non-common Occurrence: A statistic and normalization algorithm by comparing original input to distribution of distinct values of normalization result.

Finite Impulse Response (FIR) Algorithm: An algorithm for modeling by selecting the coefficients such that the system has specific characteristics.

Infinite Impulse Response (IIR) Algorithm: An algorithm for modeling with impulse response function which is non-zero over an infinite length of time.

Vectorization Algorithm: Vectorization, is a process of converting an algorithm from a scalar implementation, which does an operation one pair of operands at a time, to a vector process where a single instruction can refer to a vector (series of adjacent values).

Fast Fourier Transform (FFT) Algorithm: A fast Fourier transform algorithm is an algorithm to compute the discrete Fourier transform (DFT) and its inverse. FFTs.

Z-Transform Algorithm: The Z-transform converts a discrete time domain signal, which is a sequence of real numbers, into a complex frequency domain representation.

Differential Run-length Huffman Algorithm: A data compression and characteristic analysis algorithm by calculating differences and continuity of a data sequence.

Down Sampling Algorithm: A process of reducing the sampling rate. This is usually done to reduce the data rate or the size of the data.

Geometrical Prediction Algorithm: An algorithm discovering relationships of a multi-dimension data set by comparing prediction and original data.

Boundary Algorithm: A modeling process by identifying boundary of topological spaces that allow one to formalize concepts such as convergence, connectedness and continuity.

Hierarchical Linear Modeling (HLM) Algorithm: Also known as multi-level analysis, is a more advanced form of simple linear regression and multiple linear regression. HLM allows variance in outcome variables to be analyzed at multiple hierarchical levels.

Singular Value Decomposition Algorithm: singular value decomposition (SVD) is a factorization of a rectangular real or complex matrix, with several applications in signal processing and statistics.

Vertical Vectorization Algorithm: A vectorization along with the vertical dimension.

Horizontal Grouping Algorithm: A grouping process along with the horizontal dimension.

Gravity-Velocity Analysis Algorithm: An algorithm partitioning a multi-dimension data set into groups and sub-domains by calculating predictability and continuity.

Bayesian Analysis Algorithm: Bayesianism is the tenet that the mathematical theory of probability is applicable to the degree to which a person believes a proposition. Bayesians also hold that Bayes' theorem can be used as the basis for a rule for updating beliefs in the light of new information—such updating is known as Bayesian inference. Bayesianism is an application of the probability calculus and a probability interpretation of the term probable, or—as it is usually put—an interpretation of probability.

Error Diffuse Iteration Algorithm: An algorithm for solving relations between different data sets by prediction and error feedback.

Constraints: Events, conditions, or rules, in a form of mathematical representations, that limit expected outcome from a task.

Pattern-Relationship: Representing relations between groups of data by defining N factors with weights each as pattern and M factors with weights as their relationships.

Vendor Independent Model: Representing an implementation independent model of a multiple nodes system by defining inputs, outputs and stimulation-reaction pattern between input and output.

The present information is a system that provides capabilities of collecting data, partitioning data, modeling, and analyzing created models in accordance of various intelligence. There are five major modules namely, data collector, data partitioner, data modeler, model analyzer, and optimizer.

The data collector collects user data from real life operation behavior that are required for analysis. For example, in a wireless network environment the user data may include, but not limited to, radio frequency data, performance counter, environment definition, and hardware rules. For a national security command control channel, the user data may include, but not limited to, legs of command channel, delay of command issuance, rules of command communication, communication hardware constraints, and resource availability. The user data are collected through a predefined time of period so that these data represent a real-life historical data. When these data were collected, it includes timing and situations when both normal and abnormal events occurred. For example, the performance counter in a network environment includes the performance data of various circuit cards collected within a period of time. The "delay of a command issuance" in a command control channel includes the delay data that are collected through a period of time. Therefore, the data collected represent what have happened in a real life of a real environment.

The data partitioner partitions the collected user data in accordance of data type and predefined partition rules. User data are partitioned in a way such that related data can be grouped together for modeling process. The data partitioner further creates indices to indicate the grouped data or particular data in a group. For example, the grouped data may be grouped in plurality of data files. The indices may indicate locations or the names of data files. The indices may also indicate locations of particular data elements within data files. The process of partitioning, grouping, and indexing are for the ease of retrieving data by the system for creating various models. There are many indexing methods known to one skilled in the art. Every indexing method has its own purpose and advantages. This invention implements indexing methods including replicate tree indexing, hash code indexing, reverse indexing, and suffix indexing. Other indexing methods may also be implemented depending on the nature and characteristics of an operating system and environment where various types of data are collected.

The data modeler generates various models by using the partitioned data and predefined modeling rules. The predefined modeling rules are additional rules specific to the modeling environment. For example, network topology, equipment configurations, and network design rules are specific modeling rules for the network environment. For a command control channel environment, the command level, command authority, and command topology are specific modeling rules for the data modeler. The data modeler takes partitioned data as input and uses various modeling algorithms to generate different models. The generated models represent different characteristics of the real-life operation environment where the user data were collected. These models present both normality and abnormalities of operation events from the collected data. The models present what events caused the abnormalities in view of any other factors. For example, in a network environment, the models may present a surge of communication traffic at a specific time. The models may also present occurring frequency of any abnormalities. The modeling process is an intensive mathematical calculation and processing on the collected data. The outcome of the modeling process are models which are represented by strings of numbers. This invention implements modeling algorithms including, but not limited to, Finite Impulse Response (FIR) algorithm, Infinite Impulse Response (IIR) algorithm, Segmentation algorithm, Vectorization algorithm, Fast Fourier Transform (FFT) algorithm, Z-Transform algorithm, Differential Run-length Huffman algorithm, Down Sampling algorithm, Geometrical Prediction algorithm, Boundary algorithm, and Hierarchical Linear Modeling algorithm. Other modeling algorithms that are known to one skilled in the art may be implemented by this invention without departing the invention concept.

The data analyzer analyzes the models generated by the modeler in accordance with predefined rules. For a network environment, the predefined rules may be, but not limited to, design rules and equipment configuration rules. The algorithms for data analyzer analyzing the plurality of models comprise Singular Value Decomposition algorithm, Vertical Vectorization algorithm, Vertical Grouping algorithm, Horizontal Grouping algorithm, Gravity-Velocity Analysis algorithm, Bayesian Analysis algorithm, Error Diffuse Iteration algorithm to generate Vendor Independent Models, and Pattern-Relationship. The results of the analysis performed by the data analyzer include an Optimal Model that best represents the operation system where the operation data were collected.

The Optimizer provides a tool to conclude an optimal solution based on the optimal model and various desired operation requirements. The optimal solution indicates the desired performance of the operation system in accordance with changing system requirement. Theses system requirements are various affecting factors that determine how the system perform. In a wireless network environment, the system requirements may be vendor specific equipment limitations, network topology limitations, radio frequency resource limitations, traffic load requirements, etc. For a command control system, the system requirements may be legs of command channel path limitations, command authority limitations and requirements, command issuance and response requirements, etc.

Embodiment 1

In a wireless network, the growth of traffic either due to subscribers demands or special events have been significant issues for a service carrier to concern their network's performance. There are many factors and network elements to be considered when upgrading or reconfiguring the network in order to meet the performance requirements. The factors and elements include radio frequency (RF) resources, network topology, hardware elements, design rules, equipment vendor specific constraints, etc. All performance data from the network can be collected through time for analysis. However, these raw data, not only because its huge amount but also have no correlation between each other, are beyond human being's capability to analyze and conclude with an optimal solution in an accurate manner.

This invention first collects Environment Definitions, Hard Rules, Performance Counter, and RF Data that either have been collected through a period of time from live traffic or are predefined rules. The Data Partitioner partitions these data in a way that related data can be grouped together. The Data Partitioner generates data files and indices. The data files comprise partitioned data and the indices indicate the data files and specific data within the data files. This partitioning and grouping process is an essential preparation in order to efficiently access the collected raw data for modeling.

After partitioning and grouping performed by the Data Partitioner, the partitioned data files are input to the Data Modeler. The Data Modeler, in response of receiving the data files, generates plurality of models in accordance with various predefined rules. These predefined rules include Design Rules, Network Topology, and Equipment Configuration Rules. The modeling processes, based on different modeling algorithms, are a series of mathematical computations. The results, in formats of mathematical representations, are the models that present different operation characteristics of the collected real-life data. The operation characteristics include, for example, peaks of traffic occurred, frequency of the peaks of traffic occurred within a specified period of time, load of particular network elements, etc. By having these models, the service carrier can better realize how the network performed in view of the planned performance goals.

The Model Analyzer, in response of receiving the models, analyzes these models in accordance with the predefined Design Rules and Equipment Configuration Rules and generates Intermediate Optimal Models. The analysis starts with predefined Constraints and, based on the Constraints, an Intermediate Optimal Model is created. By adjusting the Constraints, the Data Analyzer repeats the analysis and concluded with an Optimal Model. An Optimizer, in accordance with the Optimal Model and desired system requirements, generates a performance solution. The analysis performed by the Data Analyzer and the optimization performed by the Optimizer are repeated until the performance solution reaches a predefined range. The final Intermediate Optimal Model is an Optimal Model representing the operation system and the final performance solution is the optimal solution of the system based on the desired performance requirements and system constraints.

Embodiment 2

In a command control environment, the command traffic are routinely tracked and recorded. The traffic data includes, but not limited to, volume of command instructions, types of commands, time delay of command issuance, time delay of each command process at each hub along the command channel, authority level of each command hub, command hub topology, hardware limitations of command channels.

The collected real-life data are input to the Data Partitioner and are, then, partitioned and grouped. Associated indices are also generated to indicate the grouped data after partitioning as well as to indicate particular data located within particular data groups. The partitioning and grouping process performed by the Data Partitioner is to efficiently organizing related data for the ease of access by the Data Modeler.

The partitioned and grouped data are then input to the Data Modeler for generating various models in order to present different system characteristics obtained from the real-life data collection. By using mathematical modeling algorithms, the models are represented in different mathematical expressions. The models may present significant command delays at a particular time period, delays due to lack of authority level, delays due to hardware or topology limitations. Therefore, any outstanding characteristic, either normal or abnormal, can be identified by these models.

The models are further analyzed by the Model Analyzer to generate optimum solutions for improving the command control system performance under specified Constraints. The Constraints can be dynamically generated for recursive analysis processes until an optimum solution is concluded within a predefined value.

It is to be understood that the embodiments and variations shown and described herein are merely illustrative of the principles of this invention and that various modifications may be implemented by those skilled in the art without departing from the scope and spirit of the invention.

The invention claimed is:

1. A computer-readable medium having computer-executable instructions for analysis of a wireless network, wherein said instructions comprising:
   instructing a data partitioner to receive a first set of plurality types of data, wherein the data partitioner partitions the first set of data and groups the partitioned data into a plurality of data files, and the data partitioner generates indices according to the first set of data; and
   instructing a data modeler to receive a second set of plurality types of data, wherein the data modeler generates a plurality of models according to the first set of data and the second set of data.

2. The computer-readable medium having computer-executable instructions for analysis of a wireless network of claim 1, wherein said instructions comprising:
   instructing a model analyzer to receive a third set of plurality types of data wherein the model analyzer analyzes the plurality of models according to the third set of plurality types of data.

3. The computer-readable medium having computer-executable instructions for analysis of a wireless network of claim 2, wherein the indices indicate the data files and the partitioned data in the data files.

4. The computer-readable medium having computer-executable instructions for analysis of a wireless network of claim 3, wherein the indices are generated by using indexing algorithms comprising of R-Tree Indexing, Hash Code Indexing, Reverse Indexing, and Suffix Indexing.

5. The computer-readable medium having computer-executable instructions for analysis of a wireless network of claim 2, wherein said instructions comprising:
   instructing the data partitioner to partition the first set of data by selecting an Average value of the first set of data, and by selecting data from eighty percent of normal distribution of the first set of data, and by selecting data from twenty percent of the first set of data wherein the twenty percent of the first set of data were not selected by the selection of the eighty percent of the normal distribution of the first set of data, and by selecting data of maximum values and minimum values from the first set of data, and by selecting data from common occurrence data of the first set of data, and by selecting data from non-common occurrence data of the first set of data.

6. The computer-readable medium having computer-executable instructions for analysis of a wireless network of claim 5, wherein the plurality of models are generated by Finite Impulse Response (FIR) algorithm, and Infinite Impulse Response (IIR) algorithm, and Segmentation algorithm, and Vectorization algorithm, and Fast Fourier Transform (FFT) algorithm, and Z-Transform algorithm, and Differential Run-length Huffman algorithm, and Down Sampling algorithm, and Geometrical Prediction algorithm, and Boundary algorithm, and Hierarchical Linear Modeling algorithm.

7. The computer-readable medium having computer-executable instructions for analysis of a wireless network of claim 6, wherein said instructions comprising:
   instructing the model analyzer to analyze the plurality of models by using Singular Value Decomposition (SVD) algorithm, and Vertical Vectorization algorithm, and Vertical Grouping algorithm, and Horizontal Grouping algorithm, and Gravity-Velocity Analysis algorithm, and Bayesian Analysis algorithm, and Error Diffuse Iteration algorithm to generate an optimal model.

8. The computer-readable medium having computer-executable instructions for analysis of a wireless network of claim 7, wherein said instructions comprising:
   instructing the model analyzer to generate Dynamic Constraints; and
   instructing the model analyzer to generate modified optimal models by new Dynamic Constraints.

9. The computer-readable medium having computer-executable instructions for analysis of a wireless network of claim 8, wherein the instructions comprising:
   instructing an Optimizer, in accordance with the modified optimal models, to generate an optimal system performance solution.

10. A computer-readable medium having computer-executable instructions for analysis of a wireless network, wherein said instructions comprising:
    instructing a data partitioner to receive a first set of plurality types of data, wherein
    the data partitioner partitions the first set of data and groups the partitioned data into a plurality of data files, and the data partitioner generates indices according to the first set of data; and
    instructing a model analyzer to receive a second set of data and generate optimal models and Dynamic Constraints.

11. The computer-readable medium having computer-executable instructions for analysis of a wireless network of claim 10, wherein said instructions comprising,
    instructing a data modeler to receive a third set of plurality types of data, wherein the data modeler generates a plurality of models according to the first set of data and the third set of data.

12. The computer-readable medium having computer-executable instructions for analysis of a wireless network of claim 11, wherein the indices indicate data files and the partitioned data in the data files, and the indices are generated by using replicate tree indexing, hash code indexing, reverse indexing, and suffix indexing.

13. The computer-readable medium having computer-executable instructions for analysis of a wireless network of claim 11, wherein said instruction comprising:
    instructing the data partitioner to partition the first set of data by selecting an Average of the first set of data, and by selecting data from eighty percent of normal distribution of the first set of data, and by selecting data from twenty percent of the first set of data wherein the twenty percent of the first set of data were not selected by the selection of the eighty percent of the normal distribution of the first set of data, and by selecting data of maximum values and minimum values from the first set of data, and by selecting data from common occurrence data of the first set of data, and by selecting data from non-common occurrence data of the first set of data.

14. The computer-readable medium having computer-executable instructions for analysis of a wireless network of claim 13, wherein the plurality of models are generated by Finite Impulse Response (FIR) algorithm, and Infinite Impulse Response (IIR) algorithm, and Segmentation algorithm, and Vectorization algorithm, and Fast Fourier Transform (FFT) algorithm, and Z-Transform algorithm, and Differential Run-length Huffman algorithm, and Down Sampling algorithm, and Geometrical Prediction algorithm, and Boundary algorithm, and Hierarchical Linear Modeling algorithm.

15. The computer-readable medium having computer-executable instructions for analysis of a wireless network of claim 14, wherein said instructions comprising:
  instructing the model analyzer to analyze the plurality of models by using Singular Value Decomposition (SVD) algorithm, and Vertical Vectorization algorithm, and Vertical Grouping algorithm, and Horizontal Grouping algorithm, and Gravity-Velocity Analysis algorithm, and Bayesian Analysis algorithm, and Error Diffuse Iteration algorithm to generate optimal models.

16. The computer-readable medium having computer-executable instructions for analysis of a wireless network of claim 15, wherein said instructions comprising:
  instructing the model analyzer generates optimal models by Dynamic Constraints; and
  instructing an Optimizer to generate an optimal performance solution based on one of the optimal models.

17. A computer-readable medium having computer-executable instructions for analysis of a wireless network, wherein said instructions comprising:
  instructing a data partitioner to receive a first set of plurality types of data, wherein the data partitioner partitions the first set of data and groups the partitioned data into plurality of data files, and the data partitioner generates indices according to the first set of data;
  instructing a data modeler to receive a second set of plurality types of data, wherein the data modeler generates a plurality of models according to the first set of data and the second set of data; and
  instructing a model analyzer to receive a third set of data wherein the model analyzer analyzes the plurality of models according to the third set of data.

18. The computer-readable medium having computer-executable instructions for analysis of a wireless network of claim 17, wherein the indices indicate data files and the partitioned data in the data files; and the indices are generated by using replicate tree indexing, hash code indexing, reverse indexing, and suffix indexing.

19. The computer-readable medium having computer-executable instructions for analysis of a wireless network of claim 18, wherein said instructions comprising:
  instructing the data partitioner to partition the first set of data by selecting an Average of the first set of data, and by selecting data from eighty percent of normal distribution of the first set of data, and by selecting data from twenty percent of the first set of data wherein the twenty percent of the first set of data were not selected by the selection of the eighty percent of the normal distribution of the first set of data, and by selecting data of maximum values and minimum values from the first set of data, and by selecting data from common occurrence data of the first set of data, and by selecting data from non-common occurrence data of the first set of data; and
  the plurality of models are generated by Finite Impulse Response (FIR) algorithm, and Infinite Impulse Response (IIR) algorithm, and Segmentation algorithm, and Vectorization algorithm, and Fast Fourier Transform (FFT) algorithm, and Z-Transform algorithm, and Differential Run-length Huffman algorithm, and Down Sampling algorithm, and Geometrical Prediction algorithm, and Boundary algorithm, and Hierarchical Linear Modeling algorithm.

20. The computer-readable medium having computer-executable instructions for analysis of a wireless network of claim 19, wherein said instructions comprising:
  instructing the model analyzer to analyze the plurality of models by using Singular Value Decomposition (SVD) algorithm, and Vertical Vectorization algorithm, and Vertical Grouping algorithm, and Horizontal Grouping algorithm, and Gravity-Velocity Analysis algorithm, and Bayesian Analysis algorithm, and Error Diffuse Iteration algorithm to generate Vendor Independent Models, and Pattern-Relationship;
  instructing the model analyzer to generate optimal models and Dynamic Constraints; and
  instructing an Optimizer to generate an optimal solution based on one of the optimal models.

* * * * *